United States Patent [19]
Gossain et al.

[11] Patent Number: 5,974,255
[45] Date of Patent: Oct. 26, 1999

[54] METHOD FOR STATE-BASED ORIENTED TESTING

[75] Inventors: Dhiraj Kumar Gossain, Phoenix; Dana Mark Rigg, Chandler, both of Ariz.

[73] Assignee: Motorola, Inc., Schaumburg, Ill.

[21] Appl. No.: 08/137,704

[22] Filed: Oct. 18, 1993

[51] Int. Cl.$^6$ ..................................................... G06F 9/455
[52] U.S. Cl. ............................ 395/704; 714/38; 707/103
[58] Field of Search .......................... 371/19, 21.2, 25.1, 371/26; 364/267.91, 275.5; 395/500, 704, 705, 703, 702; 709/303; 714/38

[56] References Cited

U.S. PATENT DOCUMENTS

| | | | |
|---|---|---|---|
| 4,885,717 | 12/1989 | Beck et al. ................................ | 395/704 |
| 5,093,914 | 3/1992 | Coplien et al. ........................... | 395/704 |
| 5,237,654 | 8/1993 | Shackelford et al. ................... | 345/357 |
| 5,295,222 | 3/1994 | Wadhwa et al. ......................... | 395/703 |
| 5,307,499 | 4/1994 | Yin ........................................... | 395/705 |
| 5,337,262 | 8/1994 | Luthi et al. .............................. | 702/83 |

OTHER PUBLICATIONS

Bjarne Stroustrup, "What Is Object–Oriented Programming?", IEEE Software, May 1988, pp. 10–20.

"Turbo C++" User's Guide, Second Edition, Borland International, 1991.

Simon Took; Object Oriented Debugging; Nov. 1990; Dr. Dobbs Journal pp. 36–42.

*Primary Examiner*—Zarni Maung
*Assistant Examiner*—Kenneth R. Coulter
*Attorney, Agent, or Firm*—Rennie W. Dover

[57] ABSTRACT

An object oriented test provides a hierarchy of classes under test, each of the classes under test having a predefined inheritance structure. The test provides a test class for each corresponding class under test. Each class under test has a test member function, a set state member function, a verify state member function, and a test vector which includes an initial complete state, an expected complete state, a set of function inputs for a member function being tested, and a set of expected results. The test sets an initial complete state of the test class by implicitly calling the set state member functions through the inheritance structure of the test classes. Next a member function of a desired class under test is executed. The final complete state of the class under test as well as the outputs and returned values of all member functions which were executed are compared with the set of expected results.

10 Claims, 1 Drawing Sheet

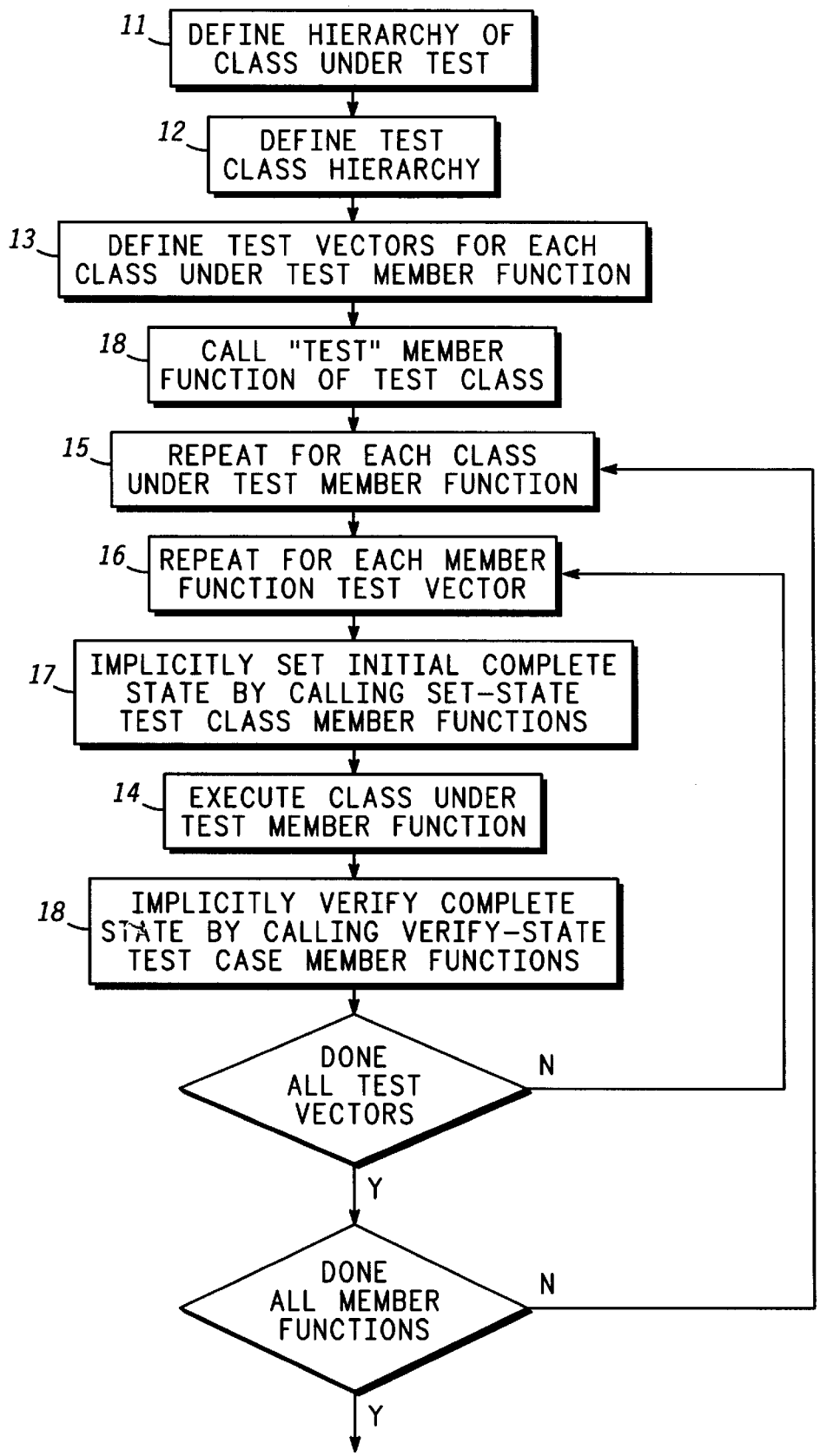

METHOD FOR STATE-BASED ORIENTED TESTING

BACKGROUND OF THE INVENTION

The present invention relates, in general, to software engineering, and more particularly to testing of object oriented software.

According to the prior art, testing of software modules has taken place only on an individual module by module basis. When using structured software the basic unit is the function. Traditional tests of such software supply a set of inputs, execute the function, and examine the outputs to verify that correct results were obtained. Functions are assumed to maintain no state information that is used during subsequent executions. More recently use of object oriented programming methodologies has become common. The special requirements of object oriented programming are outlined in a paper entitled "What is Object oriented Programming?", by Bjarne Stoustrup, published May 1988 in IEEE Software, which is included herein by reference. Another explanation related to C++ is found on pages 127–200 of the "Turbo C++ User's Guide", Second Edition, published in 1991 by Borland International, Inc., which is included herein by reference.

For object-oriented software, structural testing is inadequate because the internal state of objects is not tested. The basic unit in object-oriented software is the class. Classes are tested by setting an initial state, executing one or more class operations, and verifying that the final state is correct. However, prior art practices only consider those data members defined in a class to be a part of the class' state. In actuality, the state of a class consists of data members defined within the class and those that are inherited. Therefore, prior art testing methods do not verify the complete state of an object.

There is a need for a method to test the complete state of an object within an object oriented program. The method should be easily automated and verify the state of all levels of the inheritance hierarchy. Ideally the method should minimize the effort required and allow the resultant object code to be unchanged as a result of the testing.

BRIEF DESCRIPTION OF THE DRAWING

The single figure shows a flow chart which illustrates the major steps of a method which is in accordance with a preferred embodiment of the present invention.

DETAILED DESCRIPTION OF THE DRAWING

The single figure shows a flow chart which illustrates the major steps of a method as a preferred embodiment in accordance with the present invention. For simplicity the preferred embodiment is described using C++ terms and conventions, however other embodiments use different object oriented programming languages. A hierarchy of classes under test is defined 11 by creating an object oriented software system. Every class in the system becomes a class under test during the software testing process. To simplify testing, each class under test should have an assignment operator (=), a comparison operator (==), and an output operator (<<). All stream based class under test member functions and operators should receive a stream as a parameter to allow the testing software to control inputs and review outputs. Constant values should have publicly available definitions usable by the testing software. When there is a restricted number of values that a class under test data member may take, the legal value set should be specified using an enumerated type to enhance boundary testing. Each class under test should also have a constructor with no parameters (the test software will define the state of each object). Finally, every class under test should contain a copy constructor. Note that the above items are not required in order for the testing strategy to work, but they greatly simplify the task of automating test code generation and test vector creation.

A test class hierarchy is defined 12, wherein each class under test has a corresponding test class. The test class hierarchy duplicates the inheritance hierarchy of the classes under test. Four goals should be met when defining a test class. First, the test class architecture must be generic to accommodate automation. Second, the testing intelligence must appear in the test data, not the test code. Thus, when a new test is required, the user need only add more test data rather than change the test code. Third, a test class should be as non-intrusive as possible, meaning that changes to the class under test in order to accommodate the test class must be minimized. Lastly, the test class must have complete access to it's associated class under test in order to control and observe the classes under test's behavior.

A C++ coded example of classes under test and appropriate test classes is shown below:

```
// Define classes under test A and B
class A {
    int a1, a2;
    int a_compute(int x);
        friend class A_test;
}
class B: public A {
    int b1, b2;
    int b_compute(int x);
        friend class B_test;
}
// Define the test classes A_test and B_test
class A_test {
    int test ( );
    void set_state(A_initial_state);
    int verify_state(A_expected_state,
                                expected_return, rtn);
}
class B_test: public A_test {
    int test( );
    void set_state(B_initial_state);
    int verify_state(B_expected_state,
                                expected_return, rtn);
}
```

Each test class contains a "test" member function that performs all of the tests to be conducted on it's associated class. Each test class also contains set-state and verify-state member functions. The set-state member function is used to assign values to the elements related to an object in order to initialize the object to a known state. At least one test vector is defined 13 for each class under the test member function. Each test vector comprises an initial complete state, an expected complete state, a set of function inputs, and a set of expected results for the member function being tested. The verify state member function is used to compare the current values of an objects data elements to an expected set of values. Each test class is declared to be a "friend" of its associated class under test. In C++, this gives the test class access to private data elements contained in the class under test. This association allows the member functions of the test class to read and write all data elements contained in the class under test.

The testing is initiated by calling 18 the test member function of the class under test. The test proceeds by setting 17 an initial complete state of the test class. Setting 17 the initial complete state is achieved by implicitly calling the set state member functions through the inheritance structure of the test classes. Next, a member function of the class under test is executed 14.

The results obtained are implicitly compared 18 to the expected results. When a difference between the current state and expected state of an object is detected, the return value of the verify state member function is set to indicate an error condition. This return value propagates back through the inheritance hierarchy to the leaf test class. Steps 17, 14, and 18 are repeated for each member function 15 of that test class and for each test vector 16 of each member function.

For example, to test the functionality of class B (which inherits from class A), the test( ) member function in class B_test is called. The B_test::test( ) member function looks like the following pseudo code:

```
// Pseudo code
// The set_state function of class B_test takes an initial
//state definition, which defines value for the data
//elements of class B, and contains an initial state for
//class A that is passed to the set_state function of class
//A_test. The same principle applies to verify_state.
void B_test::set_state(B_initial_state)
    set data members of B using values from B_initial_state
    A_test::set_state(B_initial_state.A_initial_state)
int B_test::verify_state(B_expected_state, expected_rtn,
                rtn)
    compare data members of B with values from
                B_expected_state
    A_test::verify_state(B_expected_state.A_expected_state)
    compare expected_return with rtn
    return result of comparisons
int B_test::test( )
    for every vector    // Vector contains B_initial_state,
                        //input, B_expected_state, and
                        //expected_return
        B_test::set_state(B_initial_state)
        rtn <- B::b_compute(input)
        B_test::verify_state(B_expected_state,
            expected_return, rtn)
```

The pseudo code shows how the testing methodology works when testing the b_compute member function of class B. A set of test vectors is prepared with each vector containing an initial state, a set of inputs for the b_compute member function, an expected state, and an expected return value. The initial state and expected state not only contain values for the data elements defined in class B, but also for those defined in class A. For every test vector, the initial state of an object is set, the b_compute function is executed, and the final state and return condition are verified.

The goal when calling B_test::test( ) is to verify the functionality and complete object state of every member function defined within class B (represented by the statement "rtn<-B::b_compute(input)" above). Basically, if class B has three member functions, then there needs to be three sets of vectors that contain the initial state, expected state and expected return for different invocations of that member function. So, when B_test::test( )is called, for every member function in class B and for each test vector defined by the user, B_test::set_state( ) is called to set the initial complete state of class B. Since B inherits from A, B_test::set_state( ) calls A_test::set_state( ). Technically this call is explicit (look at the pseudo code above in B_test::set_state( )), but it can be referred to as an implicit call because a automated test generator can analyze the inheritance hierarchy and know that B_test::set_state( ) must call A_test::set_state( ) and could simply generate that piece of code.

After the statement "rtn<-B::b_compute(input)" is called, B_test::verify_state( ) is called. Here again, B_test::verify_state( ) "implicitly" calls A_test::verify_state( ) because to verify whether or not the call to B::b_compute (in the statement "rtn <-B::b_compute(input)") met the test specification, the complete state of class B needs to be verified, requiring the state of class A to be verified (through A_test::verify_state( )).

An alternative embodiment in accordance with the present invention uses a conditional compilation process to include the test class hierarchy during software development, but to exclude the test class hierarchy for the final software. In this way the automated testing does not affect the final object code which is delivered to a user.

By now it should be clear that the present invention provides a method to test the complete state of an object within object oriented software. The method is easily automated and can verify the state of all levels of the inheritance hierarchy. The method minimizes the effort required and allows the resultant object code to be unchanged as a result of the testing.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A method for object oriented testing in a computer system, comprising:

creating a first hierarchy of classes under test in a computer system's memory, wherein each class under test has a predefined inheritance structure;

creating a second hierarchy of test classes in the computer system's memory, wherein each test class corresponds to a class under test of the first hierarchy of classes under test and wherein each test class has a predefined inheritance structure granting the test class with access to all data and member functions of the corresponding class under test;

supplying each class in the second hierarchy of test classes with a test member function, a set state member function, a verify state member function, and at least one test vector;

setting an initial complete state of each test class by implicitly calling through the second hierarchy of test classes the set state member function of each test class through its inheritance structure;

executing a member function of a class under test; and comparing a final complete state of the class under test and returned values of all member functions of the class under test, which were executed with a set of expected results, by implicitly calling through the second hierarchy of test classes the verify state member function through the predefined inheritance structure of the corresponding test class.

2. The method for object oriented testing of claim 1 wherein the at least one test vector comprises an initial complete state, an expected complete state, a set of function inputs for a member function being tested, and a set of expected results.

3. The method for object oriented testing of claim 1 wherein a set of predetermined instructions are coded using C++ language.

4. The method for object oriented testing of claim 1 wherein each test class is included within its corresponding class under test by means of a conditional compilation.

5. The method for object oriented testing of claim 1 further comprising:

formulating a set of coding rules to facilitate automated generation of the class under test.

6. The method for object oriented testing of claim 1 further comprising:

executing a second member function of the class under test.

7. The method for object oriented testing of claim 1 wherein the at least one test vector further comprises an initial object state, an expected object state, a set of member function inputs, and a set of expected results.

8. The method for object oriented testing of claim 1 wherein each test class is a friend class of its corresponding class under test.

9. A method for object oriented testing, comprising:

creating a first hierarchy of C++ classes under test stored in a computer system's memory, wherein each C++ class under test of the first hierarchy has a predefined inheritance structure;

creating a second hierarchy of C++ test classes, wherein each C++ test class of the second hierarchy has a corresponding C++ class under test of the first hierarchy and wherein each C++ test class is defined as a C++ friend of the corresponding C++ class under test, the second hierarchy of C++ test classes being stored within the computer system's memory, and wherein each member of the second hierarchy of C++ test classes contains at least one test vector, at least one test member function, a set state member function, and a verify state member function, each of the at least one test vector comprising an initial object state, an expected object state, a set of member function inputs, and a set of expected results;

setting an initial complete state of each C++ test class by implicitly calling through the second hierarchy of C++ test classes the set state member function of each C++ test class through an inheritance structure of the C++ test classes;

executing a member function of each of the C++ classes under test desired;

comparing a final complete state of each of the C++ classes under test and returned values of all member functions which were executed with the set of expected results by implicitly calling, through the second hierarchy of C++ test classes, the verify state member function through the inheritance structure of each corresponding C++ test class;

repeat setting an initial complete state, executing a member function, and comparing the final complete state for each of the member functions and at least one test vector; and performing preceding steps using a computer system in accordance with a set of predetermined instructions stored in the computer system's memory.

10. A method for object oriented testing, comprising:

creating a first hierarchy of classes under test stored in a computer system's memory;

defining a plurality of test classes, wherein each test class corresponds to a specific class under test, wherein each test class defined becomes a member of a second hierarchy of test classes which matches the first hierarchy of classes under test;

defining a plurality of set state member functions, a plurality of verify state member functions, a plurality of test vectors, and a test member function within each member of the second hierarchy of test classes, wherein each test vector includes at least an initial object state, an expected object state, and a set of function inputs;

setting an initial complete state of the test class by implicitly calling through the second hierarchy of test classes the plurality of set state member functions through an inheritance structure of the test classes;

executing a member function of a desired class under test;

comparing a final complete state of each of the classes under test and returned values of all member functions which were executed with a set of expected results by implicitly calling through the second hierarchy of test classes the plurality of verify state member functions through an inheritance structure of the test classes;

repeating setting an initial complete state, executing a member function, and comparing the final complete state for each member function and each test vector; and performing preceding steps using a computer system in accordance with a set of predetermined instructions stored in the computer system's memory.

\* \* \* \* \*